United States Patent
Jacobson (10) Patent No.: US 8,953,769 B2
(45) Date of Patent: Feb. 10, 2015

(54) CALLING PARTY CONTROLLED RINGBACK TONES

(75) Inventor: Neil A. Jacobson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1878 days.

(21) Appl. No.: 11/449,821

(22) Filed: Jun. 9, 2006

(65) Prior Publication Data

US 2007/0286402 A1 Dec. 13, 2007

(51) Int. Cl.
*H04M 3/42* (2006.01)
*H04B 1/38* (2006.01)
*H04M 15/00* (2006.01)

(52) U.S. Cl.
CPC .......... *H04M 15/00* (2013.01); *H04M 3/42017* (2013.01)
USPC .................. 379/215.01; 379/207.16; 455/567

(58) Field of Classification Search
USPC ......... 379/215.01, 256, 257, 207.16; 455/567
See application file for complete search history.

(56) References Cited

U.S. PATENT DOCUMENTS

| | | | |
|---|---|---|---|
| 4,277,649 A | 7/1981 | Sheinbein | |
| 4,720,848 A | 1/1988 | Akiyama | |
| 4,811,382 A | 3/1989 | Sleevi | |
| 4,932,042 A | 6/1990 | Baral et al. | |
| RE34,380 E | 9/1993 | Sleevi | |
| 5,321,740 A | 6/1994 | Gregorek et al. | |
| 5,428,670 A | 6/1995 | Gregorek et al. | |
| 6,456,601 B1 | 9/2002 | Kozdon et al. | |
| 6,654,452 B1 * | 11/2003 | Murray et al. | 379/197 |
| 7,136,470 B1 * | 11/2006 | Taylor et al. | 379/114.13 |
| 7,142,656 B2 * | 11/2006 | Moody et al. | 379/207.16 |
| 7,421,067 B2 * | 9/2008 | Dewing et al. | 379/88.12 |
| 7,509,149 B2 * | 3/2009 | Shim et al. | 455/567 |
| 7,602,901 B1 * | 10/2009 | Kates et al. | 379/373.01 |
| 7,610,044 B2 * | 10/2009 | Sindoni | 455/414.1 |
| 7,664,236 B2 * | 2/2010 | Radziewicz et al. | 379/88.25 |
| 7,792,264 B2 * | 9/2010 | Pfleging et al. | 379/207.16 |
| 7,839,995 B2 * | 11/2010 | Batni et al. | 379/418 |
| 2004/0120494 A1 * | 6/2004 | Jiang et al. | 379/210.01 |
| 2006/0023862 A1 | 2/2006 | Sutcliffe | |
| 2006/0199570 A1 * | 9/2006 | Vendrow | 455/415 |
| 2006/0215829 A1 * | 9/2006 | Schwartz | 379/207.02 |
| 2007/0003046 A1 * | 1/2007 | Batni et al. | 379/215.01 |
| 2007/0032225 A1 * | 2/2007 | Konicek et al. | 455/417 |

(Continued)

FOREIGN PATENT DOCUMENTS

KR 10-2005-0027821 3/2005

OTHER PUBLICATIONS

English language Abstract of KR 10-2005-0027821.

(Continued)

*Primary Examiner* — William Deane, Jr.
(74) *Attorney, Agent, or Firm* — Greenblum & Bernstein, P.L.C.

(57) ABSTRACT

A computer readable medium stores a program for a calling party controlled ringback tone service. The service enables a calling party to control ringback tones, even overriding called party selected ringback tones. The service can operate in a wireless or wireline network, such as a voice over IP (VoIP) network or time division multiplexed (TDM) network. The calling party can be periodically billed for the ringback tone control service, as well as the ringback tones. The subscriber can configure the service via the web.

16 Claims, 5 Drawing Sheets

(56) References Cited

U.S. PATENT DOCUMENTS

2007/0121657 A1* 5/2007 Boillot et al. .................. 370/403
2009/0185669 A1* 7/2009 Zitnik et al. ............. 379/217.01

OTHER PUBLICATIONS

Canada Office action that issued with respect to patent family member Canadian Patent Application No. 2,647,202, mail date is Mar. 8, 2011.

E.P.O. Office action, mail date is Jun. 17, 2011.

"Give Callers the Star Treatment with Cingular's Exclusive Answer Tones™ Recorded by Warner Music Group Artists", press release, Jun. 1, 2006, 3 pages.

Draft Cingular Answer Tones ANR Script, May 24, 2006, 1 page.

"US Equity News: BellSouth Launches 411 Sweepstakes and Cingular Teams Up With Warner Music Group on Answer Tone Promotion", Jun. 5, 2006, 1 page.

\* cited by examiner

CALLING PARTY CONTROLLED RINGBACK TONES

BACKGROUND

1. Field of the Disclosure

The present disclosure relates to telecommunications. More particularly, the present disclosure relates to controlling ringback tones heard by a calling party.

2. Background Information

Wireline service providers, wireless service providers, and voice over IP (VoIP) service providers offer ringback tone (RBT) services. The basic service allows a user to purchase a ringback tone, which can be downloaded to the network. A ringback tone can be a tone, an audio file, a video file, etc. When a caller calls a party that has subscribed to ringback tone service, the ringback tone is played to the calling party, instead of the current standing ringing signal/tone. A ringback tone can be assigned as a default to all incoming numbers, a group of numbers or a single number. A customer can purchase/lease multiple ringback tones.

A problem with current ringback tone services is that the calling party has no control over what he hears once he dial a phone number and are waiting for the call to be established. That is, a calling party currently has no control over what ringback tone or message is being played in lieu of a ringing signal. The lack of control is particularly troublesome when callers find the ringback tone selected by the called party to be annoying or even offensive. Compounding the problem is the fact that the service provider does not have control over messages coming from "off network." Thus, a need exists for the ability to block or substitute for the ringback tone played by the called party.

DETAILED DESCRIPTION

In view of the foregoing, the present disclosure, through one or more of its various aspects, embodiments and/or specific features or sub-components, is thus intended to bring out one or more of the advantages as specifically noted below.

The present disclosure pertains to calling party controlled ringback tones. The control permits blocking of called party selected ringback tones, and could include the playing of a substitute ringback tone that the calling party has chosen. The substitute ringback tone could be a tone that the calling party has purchased/leased or a standard ringing tone. This feature gives the calling party control over what they hear while waiting for the call to be completed.

In one aspect of the present invention, a computer readable medium stores a program for a calling party controlled ringback tone service that enables a calling party to control ringback tones. The medium includes a ringback tone receiving code segment that receives a ringback tone selection from the calling party; and a ringback tone playing code segment that plays the ringback tone selection to the calling party when the calling party places a call to a called party. The medium also includes a ringback tone terminating code segment that stops playing the ringback tone selection when the called party answers the call.

In one aspect, the ringback tone playing code segment overrides a called party selected ringback tone. The ringback tone receiving code segment can receives the selection via the web. The ringback tone selection can be a list of ringback tones and the ringback tone playing code segment can play a first ringback tones from the list, during a first call and a different ringback tone from the list during a second call.

In another aspect, the medium also includes a service billing code segment that periodically generates a bill to the calling party for the calling party controlled ringback tone service. The period can be a monthly period. A ringback tone billing code segment can also be provided to generate a bill to the calling party for each ringback tone downloaded by the calling party.

In yet another aspect, the ringback tone receiving code segment receives an association between ringback tones and destinations. The ringback tone selection can be a standard ring tone. An activating code segment can be provided to receive an activation signal from the calling party during the call, the activation signal indicating that the calling party desires to override a called party selected ringback tone.

In another aspect, a calling party controlled ringback tone system executes a calling party controlled ringback tone service. The system includes a media server that plays a ringback tone selected by a calling party when the calling party places a call to a called party.

The system can also include a service control point that determines whether the calling party subscribes to the service, the service control point directing the call to the media server when the calling party is determined to be a subscriber.

In one aspect, the media server reviews a profile of the calling party to determine the selected ringback tone. The media server can originate another call from the media server to the called party in response to the call placed by the calling party. The media server can instruct a call transfer that creates a call path connecting the calling party to the called party and can also remove itself from the call path in response to the called party answering.

The system can also include a call control element operating in a voice over IP (VoIP) environment. The call control element detects when the calling party has subscribed to the service. The call control element can instruct a voice channel to be set up between the media server and an IP device of the calling party when the calling party subscribes to the service. The call control element can check a profile of the calling party to determine the selected ringback tone. The call control element can instruct disconnection of the voice channel between the media server and the IP device of the calling party when the called party answers the call. The media server can play the ringback tone selected by the calling party while overriding a called party selected ringback tone.

Figure 1:
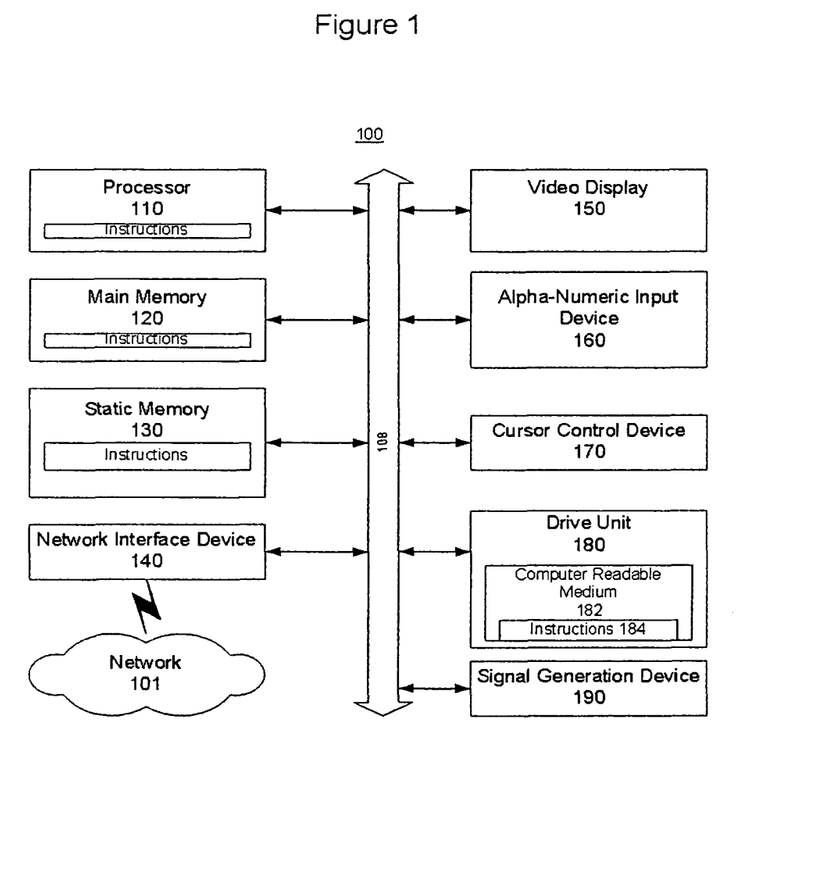
FIG. 1 shows an exemplary general computer system that can operate within the calling party controlled ringback tone system.

Referring to FIG. 1, a description is now provided of an illustrative embodiment of a general computer system 100, on which the calling party controlled ringback tone service functionality can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
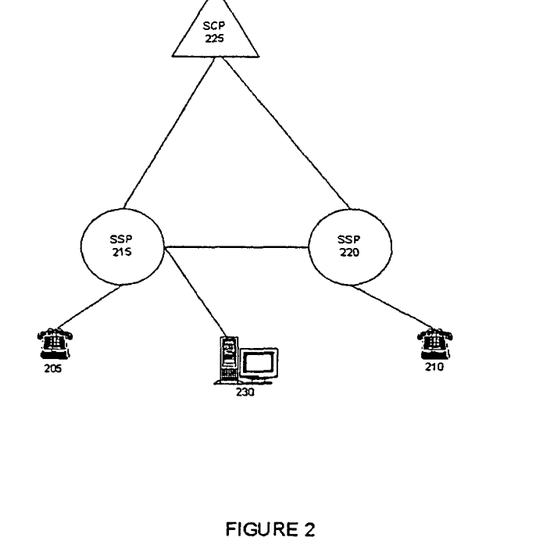
FIG. 2 shows an exemplary time division multiplexed (TDM) architecture for implementing calling party controlled ringback tones, according to an aspect of the present invention.
Figure 3:
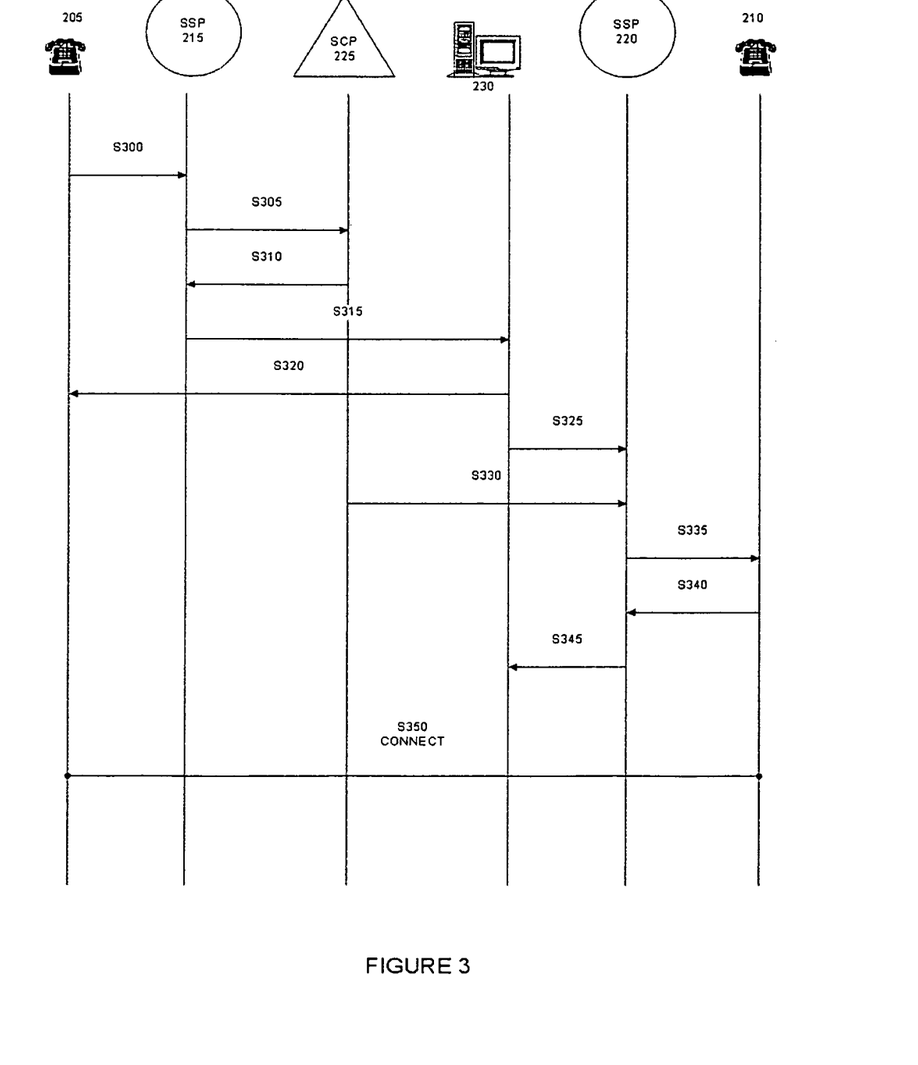
FIG. 3 shows an exemplary call flow for a time division multiplexed (TDM) calling party controlled ringback tone service, according to an aspect of the present invention.

Referring to FIGS. 2 and 3, an exemplary time division multiplexed (TDM) call flow is described.

In the following example, a calling party 205 places a call to a called party 210. The call is via two service switching points (SSPs) 215, 220, although more or fewer SSPs could be involved. A service control point (SCP) 225 communicates with the SSPs 215, 220 via service transfer points (STPs), which are not shown. A media server 230 is also provided. An exemplary media server is an enhanced media resource server (eMRS) available from Lucent Technologies, Inc. In one embodiment, the media server 230 connects to an SSP (SSP 215 in FIG. 2) via an ISDN primary rate interface (PRI). Of course, the media server 230 is not limited to being connected to SSP 215, nor is the interface limited to PRI.

At step S300, the calling party 205 lifts the handset, dials digit and places a call to the called party 210, thus initiating a connection to the originating SSP 215. The terms calling party and called party are used in this specification, although it is understood that the terms cover either the person or the device, whichever is appropriate. An originating trigger placed on the line causes a query to be placed to the SCP 225, at step S305. The SCP 225 determines whether the calling party 205 subscribes to a calling party controlled ringback tone service. If so, at step S310 the SCP 225 instructs the originating SSP 215 to connect to the media server 230. In another embodiment, the SCP 225 instructs the media server 230 to connect to the SSP 215. In response, at step S315, the originating SSP 215 connects to the media server 230, for example, via a primary rate interface. At this point, the media server 230 can check a profile of the calling party 205 to determine the ringback tone selected for playing to the calling party 205. In an alternative embodiment, the SCP 225 determines the selected ringback tone prior to step S310 and sends information indicating the selection to the SSP 215 at step S310 and to the media server 230 at step S315.

Selection of the ringback tone, as well as other service configurations can be performed by the subscriber via a web interface to the media server 230, or in an alternative embodiment, to the SCP 225. For example, the subscriber 205 can assign different ringback tones to different destination numbers. The calling party 205 could also create a list of ringback tones. In this case, each call could play a different ringback tone from the list. That is, a first call could play the first ringback tone from the list and then the next call could play the next ringback tone from the list. The subscriber 205 could also control activation and deactivation of the service via the web interface (or possibly via a control code before or during the call).

After the media server 230 determines the selected ringback tone or is informed of the ringback tone selection, at step S320, the media server 230 plays the selected ringback tone to the calling party 205 while the calling party 205 waits for the called party 210 to answer the phone. Next (or at approximately the same time or even prior), the media server 230 originates a call to the called party 215 by contacting the SSP 220, at step S325 and it is determined whether the called party is off hook. In the exemplary configuration shown in FIG. 2, the call is connected via the primary rate interface, the originating SSP 215, the trunk connecting the SSPs 215, 220, and the terminating SSP 220.

In response to the call from the media server 230, at step S330 the SCP 225 sends an authorize termination message to the terminating SSP 220, in a known manner. The authorize termination message causes the SSP 220 to ring the called party 215, at step S335. If the line is determined to be busy, an appropriate recorded announcement/tone would substitute for the ringback tone already started (or could altogether replace the ringback tone).

When the called party 215 answers the call, an off hook signal is sent to the SSP 220 at step S340. Once answer supervision is received, the ringback tone is halted and the call is completed. More specifically, in response to receiving the off hook signal, at step S345 the SSP 220 informs the media server 230. In a known manner the media server 230 then instructs a two bearer channel call transfer (2BCT) to connect the calling party 205 to the called party 215, at step S350. In one embodiment, the media server 230 drops out of the call path. In an alternative embodiment, the bridge is not performed and the media server 230 stays in the call path for the duration of the call.

Although a TDM network has been described, the present invention contemplates alternative networks. For example, a wireless network or a voice over IP (VoIP) network could also accommodate the calling party controlled ringback tone service. The exact deployment of the calling party controlled ringback tone service may vary slightly in different networks, but the resulting service will be very similar. A description of the service within a VoIP network will now be described with reference to FIGS. 4 and 5 as one example of an alternative network.

Figure 4:
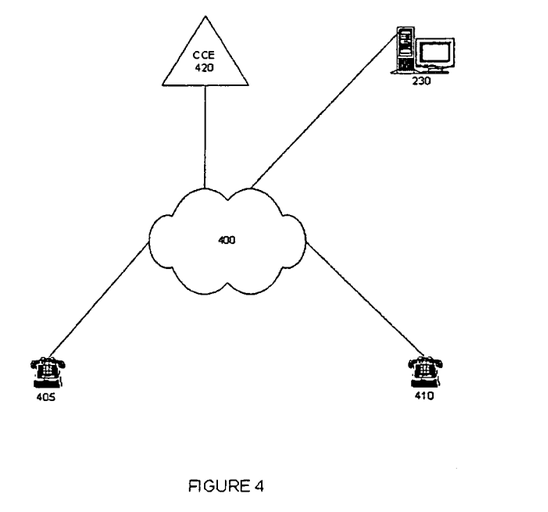
FIG. 4 shows an exemplary voice over IP (VoIP) system for implementing calling party controlled ringback tones, according to an aspect of the present invention.
Figure 5:
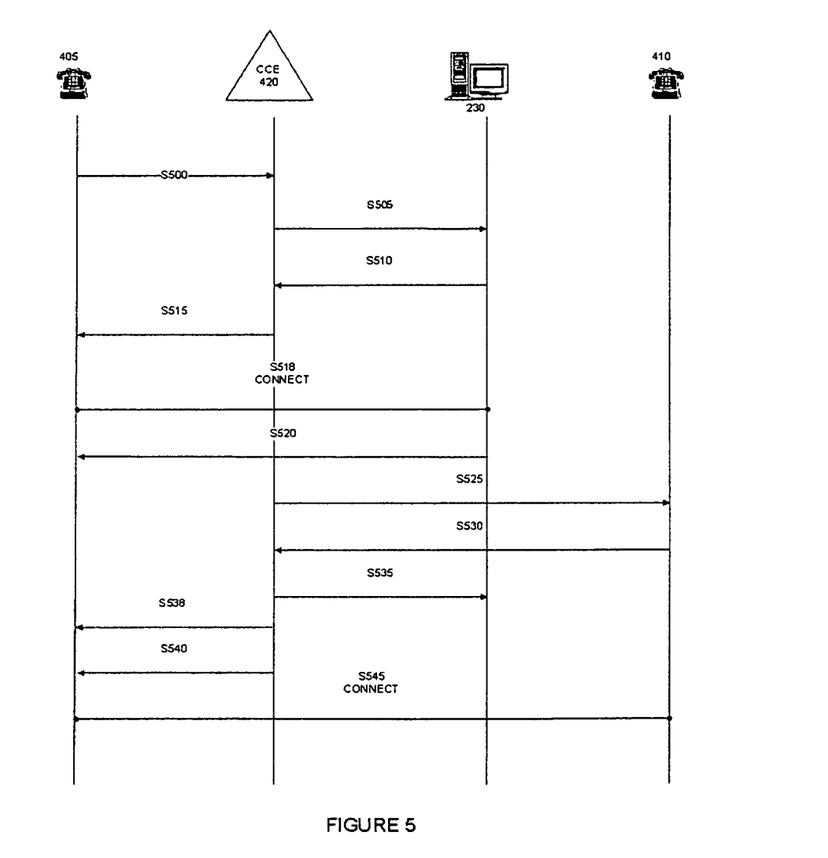
FIG. 5 shows an exemplary call flow for a VoIP calling party controlled ringback tone service, according to an aspect of the present invention.

In the following example, a calling party 405 initiates a call to a called party 410 via an IP network 400 at step S500. The equipment for placing the call could be, for example, an IP PBX or a VoIP telephone. A call control element (CCE) 420, such as a VoIP server receives indication (via a VoIP Signaling protocol such as SIP/MGCP/H.323 or others) of the initiated call request at step S500 and determines whether the calling party subscribes to the calling party controlled ringback tone service. If so, the CCE 420 send a setup message (invite) to the media server 230 at step S505. The media server 230 can connect to the IP network via an IP interface, and can be the same media server as shown in FIG. 2.

In response, at step S510, the media server 230 replies to the CCE 420 with a acknowledgment message. The CCE 420 then sends instructions (acknowledgement message) to the calling party 405 to set up a voice channel (e.g., a real time transfer protocol (RTP) session if using SIP) to the media server 230 at step S515. At step S518 the voice channel is established.

At this time, the media server 230 can check a profile of the calling party 405 to determine the ringback tone selected for playing to the calling party 405. In an alternative embodiment, the CCE 420 can determine the selected ringback tone and can send information indicating the selection to the media server 230.

In either case, after the selected ringback tone is determined, at step S520, the media server plays the selected ringback tone to the calling party 405 while the calling party 405 waits for the called party 410 to answer the phone. Next (at approximately the same time or even prior), the CCE 420 sends an invite message to the called party 410 (to determine if the line is free), at step S525, causing the called party device 410 to ring. If the line is determined to be busy, an appropriate recorded announcement/tone would substitute for the ringback tone already started (or could altogether replace the ringback tone).

When the called party 410 answers the call, an acknowledgement message is sent to the CCE 420 at step S530. In response to receiving the acknowledgement message, at step S535 the CCE 420 sends a disconnect message to the media server 230, and/or the calling party device 405 at step S538, disconnecting the voice channel between the media server 230 and the calling party device 405. In one embodiment, the CCE 420 instructs one of the devices to disconnect and that device instructs the other device to disconnect. In a known manner, at step S540 the CCE 420 then instructs the calling party device 405 to set up a voice channel (e.g., an RTP session) to the called party device 410. At step S545 the voice channel is established. Although not shown in FIG. 5, the media server 230 could initiate a call to the called party 410 and bridge the two legs of the call, similar to as described above with respect to a TDM network.

In one embodiment, the calling party controlled ringback tone is played, even when the called party subscribes to a ringback tone service that would otherwise play a called party selected ringback tone to the calling party. That is, the new feature would "block" the ringback tone played by the called party. Of course, the calling party ringback tone could also be played instead of the standard ring tone, such as the well known 440 Hz and 480 Hz signal, substituting a ringback tone that the calling party has chosen.

In one embodiment, the calling party could react to the called party selected ringback tone by activating the calling party controlled ringback tone service during the call, and even after the called party's telephone begins ringing. For example, the calling party could depress keys on the telephone (e.g., #21) to start his own ringback tone, so that the called party ringback tone is overridden. In another embodiment, the calling party ringback tone is played for all calls (without additional user action), so long as the service is activated.

In one embodiment, the service provider charges a recurring fee, such as a monthly charge, to the subscriber of the calling party controlled ringback tone service. The provider may or may not limit the number of ringback tones selected on a monthly basis. In another embodiment, the calling party selected ringback tone is purchased. In this embodiment, the service provider could charge a monthly subscription fee for the service in addition to a fee for each ringback tone selected.

In still another embodiment, the calling party selected ringback tone is a standard ringing tone. In yet another embodiment, the calling party selected ringback tone is a message created by the calling party and uploaded to the media server in a well know manner.

The disclosed embodiments are advantageous. For example, as ringback tone services become more prevalent, customers will be willing to pay for, or may even demand a control/block/substitute ringback tone service to avoid listening to a ringback tone selected by the calling party. The present disclosure enables service providers to meet this demand by providing a calling party controlled ringback tone service that allows the calling party to control the ringback tone that the calling party hears.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A calling party controlled ringback tone system for executing a calling party controlled ringback tone service, the system comprising:
   a media server that receives, in response to a selection via a web interface by a calling party and prior to a call placed by the calling party to a called party, a ringback tone selected by the calling party to play when the calling party places the call to the called party,
   wherein the calling party selected ringback tone overrides a called party selected ringback tone in response to an activation signal from the calling party during the call, the activation signal indicating that the calling party desires to override a called party selected ringback tone, and
   wherein the media server plays the ringback tone selected by the calling party while overriding the called party selected ringback tone.

2. The system of claim 1, further comprising:
   a service controller,
   wherein the service controller determines whether the calling party subscribes to the service, the service controller directing the call to the media server when the calling party is determined to be a subscriber.

3. The system of claim 1, in which the media server reviews a profile of the calling party to determine the calling party selected ringback tone.

4. The system of claim 1, in which the media server originates another call from the media server to the called party in response to the call placed by the calling party.

5. The system of claim 4, in which the media server instructs a call transfer that creates a call path connecting the calling party to the called party and the media server removes itself from the call path in response to the called party answering.

6. The system of claim 1, further comprising:
a call controller operating in a voice over IP environment, the call controller detecting when the calling party has subscribed to the service.

7. The system of claim 6, in which the call controller instructs a voice channel to be set up between the media server and an IP device of the calling party when the calling party subscribes to the service.

8. The system of claim 6, in which the call controller checks a profile of the calling party to determine the calling party selected ringback tone.

9. The system of claim 6, in which the call controller instructs disconnection of the voice channel between the media server and the IP device of the calling party when the called party answers the call.

10. A non-transitory computer-readable storage medium encoded with an executable computer program for a calling party controlled ringback tone service that enables a calling party to control ringback tones and that, when executed by a processor, causes the processor to perform operations comprising:
receiving a ringback tone selection from the calling party via a web interface and prior to a call placed to a called party;
receiving an activation signal from the calling party during the call, the activation signal indicating that the calling party desires to override a called party selected ringback tone;
playing the ringback tone selection selected by the calling party, to the calling party, while overriding the called party selected ringback tone; and
stopping playing the ringback tone selection when the called party answers the call.

11. The non-transitory computer-readable storage medium of claim 10, in which the calling party ringback tone selection comprises a list of a plurality of ringback tones, and
in which a first one of the ringback tones from the list is played during a first call and a different ringback tone from the list is played during a second call.

12. The non-transitory computer-readable storage medium of claim 10, further comprising:
periodically generating a bill to the calling party for the calling party controlled ringback tone service.

13. The non-transitory computer-readable storage medium of claim 12, in which the period comprises a monthly period.

14. The non-transitory computer-readable storage medium of claim 12, further comprising:
generating the bill to the calling party for each ringback tone downloaded by the calling party.

15. The non-transitory computer-readable storage medium of claim 10, in which an association is received between calling party selected ringback tones and destinations.

16. The non-transitory computer-readable storage medium of claim 10, in which the calling party ringback tone selection comprises a standard ring tone.

* * * * *